United States Patent [19]

Dal Monte Casoni

[11] 4,154,278
[45] May 15, 1979

[54] STRUCTURE APPLICABLE TO PNEUMATIC TIRES, ADAPTED TO SERVE AS GRIPPING MEANS ON SNOW AND ICE

[76] Inventor: Dario Dal Monte Casoni, Via G.B. Nazari, 3, 20129 Milan, Italy

[21] Appl. No.: 795,126

[22] Filed: May 9, 1977

[30] Foreign Application Priority Data

May 14, 1976 [IT] Italy .............................. 23287 A/76

[51] Int. Cl.² ............................................ B60C 27/04
[52] U.S. Cl. ............................... 152/226; 152/225 R
[58] Field of Search ............... 152/217, 219, 221, 222, 152/223, 225 R, 225 C, 226, 227, 229; 224/42.1 B

[56] References Cited

U.S. PATENT DOCUMENTS

| Re. 16,680 | 7/1927 | Hoff | 152/226 |
|---|---|---|---|
| 1,115,221 | 10/1914 | Lyon | 152/225 R |
| 1,587,313 | 6/1926 | Hisanosuke | 152/219 X |
| 2,290,398 | 7/1942 | Wellington | 152/222 X |
| 2,669,274 | 2/1954 | Mullan | 152/223 |
| 3,842,881 | 10/1974 | Muller et al. | 152/217 X |
| 3,860,053 | 1/1975 | Hatten et al. | 152/226 |

FOREIGN PATENT DOCUMENTS

| 2461991 | 7/1976 | Fed. Rep. of Germany | 152/225 R |
|---|---|---|---|
| 1037457 | 9/1953 | France | 224/42.1 B |
| 116227 | 2/1969 | Norway | 152/225 R |
| 691081 | 5/1953 | United Kingdom | 152/225 R |

*Primary Examiner*—L. J. Paperner
*Assistant Examiner*—Randolph A. Reese
*Attorney, Agent, or Firm*—Bucknam and Archer

[57] ABSTRACT

A nonskid structure applicable to pneumatic tires comprises a pair of metal rods of suitable length and elasticity, folded over so as to build rectangular frames, open on one of the longer sides. At the open ends the metal rods are bent downwardly in an orthogonal direction to the plane defined by the frames. The intermediate portion of the longer side is slightly curved. The shorter sides of the frames have the end portions bent at right angles in an orthogonal direction to the plane defined by the frames and terminate with a hook. Preferably, the shorter sides comprise an undulated portion and/or a strip of corrugated sheet for better grip on snow or ice.

2 Claims, 9 Drawing Figures

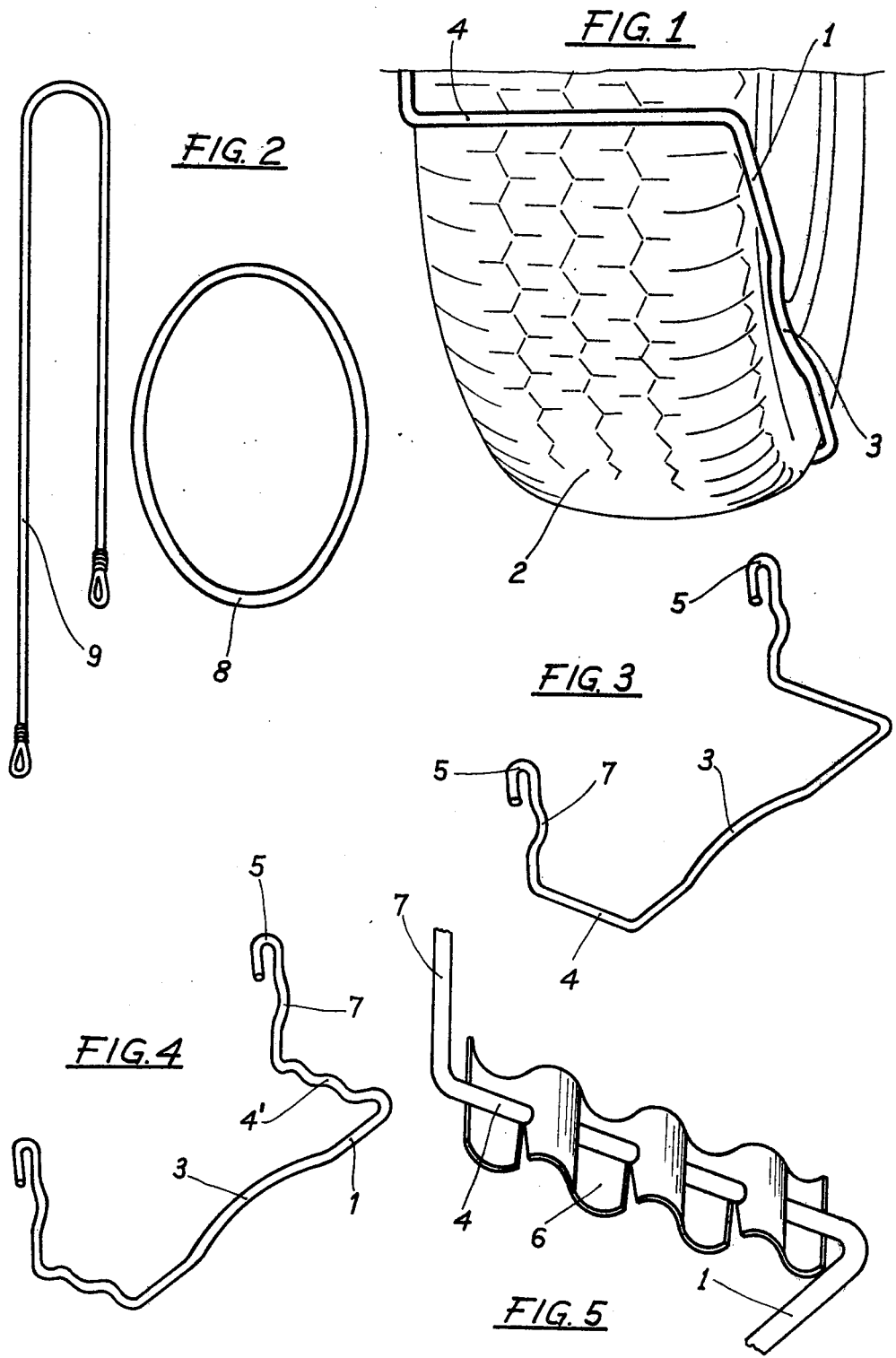

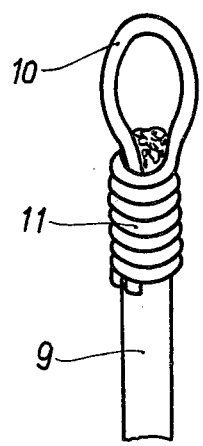
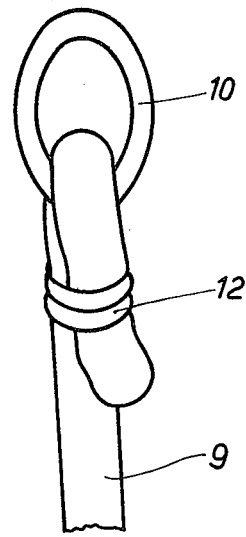
FIG. 6
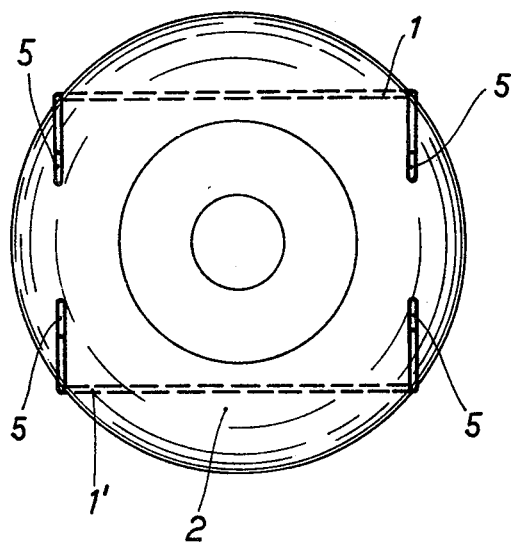
FIG. 7
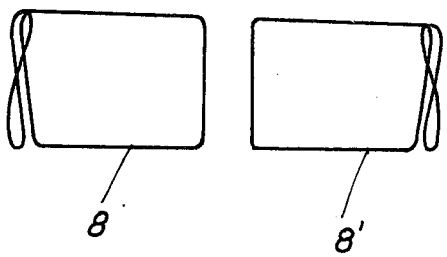
FIG. 8
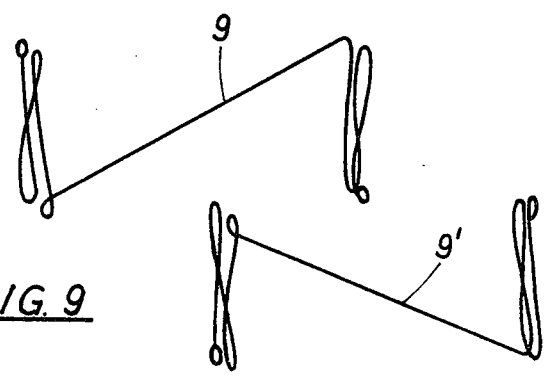
FIG. 9

STRUCTURE APPLICABLE TO PNEUMATIC TIRES, ADAPTED TO SERVE AS GRIPPING MEANS ON SNOW AND ICE

This invention relates to a structure, consisting of steel rod, applicable to pneumatic tires, adapted to serve as gripping means for pneumatic tires on snow or ice.

As it is well known, the running of motor vehicles on snow or ice covered roads is accompanied by considerable difficulties due to the reduced adherence or full lack of adherence occurring between the pneumatic tires and the road surface. Chains have been used for a long time to provide traction between the tires and the road surface.

The application of such chains requires, however, a certain experience and involves a considerable time loss in view of the need for inserting the chains underneath the pneumatic tires.

The above inconvenience is remedied by the structure made from steel rod according to the present invention.

Such structure is in fact of simplest application and requires no particular removal of the pneumatic tires on which it is fitted.

More in detail, the nonskid structure applicable to the pneumatic tires of this invention consists of a pair of metal rods of suitable length and elasticity, folded over so as to build rectangular frames being open on one of the longer sides. At such open ends the metal rods themselves are bent downwardly, orthogonally to the plane defined by the aforesaid rectangular frames and they have the end portion shaped like a hook.

The rectangular frames are particularly so dimensioned as to embrace partially the pneumatic tire, surmounting it by the shorter sides.

In practice, the two metal rod structures symmetrically embrace the pneumatic tire, building at the tread thereof four gripping means, constituted by the shorter sides of the frames.

The same structures are anchored therebetween on the outer face of the pneumatic tire by means of elastic ropes of convenient sturdiness, connecting suitably the curved ends of the two frames.

The shorter sides of such frames may further show an undulated contour or be coupled with corrugated metal sheet in order to increase the gripping capacity of the sides, especially on fresh fallen snow.

These and further characteristic features of a functional and constructional nature of the nonskid structure applicable to pneumatic tires of this invention may better be understood from the following detailed description, taken in conjunction with the various figures on the accompanying drawings, in which:

FIG. 1 shows part of a metal rod frame, mounted on a pneumatic tire;

FIG. 2 represents elastic ropes for the connection of two frames which materialize the nonskid device of this invention;

FIG. 3 illustrates one of the rectangular frames with rectilinear shorter sides;

FIG. 4 shows a frame, provided with undulated shorter sides;

FIG. 5 shows one of the shorter sides of the frame, coupled with a strip of corrugated metal sheet;

FIG. 6 represents two coupling modes of a ring at the ends of an open elastic rope;

FIG. 7 shows the structure of this invention, applied on a pneumatic tire;

FIG. 8 represents schematically a connection system of the frames by means of two closed elastic ropes; and FIG. 9 illustrates an alternative connection system of the same frames by means of two open elastic ropes.

Referring now particularly to the reference numerals given in the various figures on the accompanying drawings, the nonskid structure applicable to pneumatic tires according to the present invention consists of a pair of members 1 and 1', being suitably folded over and such as to be anchored to each other.

The said members 1 and 1' have substantially the shape of a rectangular frame, open at one of the longer sides and are so dimensioned as to embrace a sector of a pneumatic tire 2. The members are obtained from hardened steel rod for springs of high quality standard in order to resist both bending and torsional stresses developing in the zone embracing the tread when the pneumatic tire deforms on the terrain. More specifically, the frames 1 and 1' have the intermediate portion 3 of the longer side slightly curved inwardly in the rectangular frame.

By such constructional arrangement there is carried out an automatic repositioning of the frames themselves at each turn of the wheel, due to the centripetal thrust exerted by the side deformation of the pneumatic tire which widens by compressing on the ground.

The shorter sides 4 of the frames 1 and 1' have the end portion bent at right angle in orthogonal direction to the plane defined by the frames and terminate with a doubly curved part, forming a hook 5.

The shorter sides may alternatively have an undulated contour 4', capable of ensuring a better gripping on the snow or ice covered terrain.

On the same shorter sides may further be applied in the presence of fresh snow a strip of corrugated metal sheet 6 in which there are formed proper retaining seats, adapted to prevent an accidental slip-off.

It should be stressed that the particular shape of the corrugated sections 4' has the purpose of ensuring not only the holding of the members 1 and 1' on the pneumatic tires, but, above all, the absorption of the torsional motions of the hooking arms 7.

The same members 1 and 1' are obviously periodically subjected at each rotation of the pneumatic tire to a compression directed towards the middle of the pneumatic tire itself, so that their mutual spacing from each other undergoes continuous variations. Because of such fact, the rectangular members or frames 1 and 1' are connected to each other by means of an open elastic rope 9 or closed elastic rope 8, covered with an outer sheath of braided yarns of nylon or the like, capable of preventing the extension of the rope itself beyond certain limits.

The open rope is provided in particular with a hooking ring 10 at both ends.

Such hooking ring may be secured (FIG. 6) at the ends of the rope 8 by means of a winding 11 arranged tightly at one of the end portions.

The hooking ring 10 may be anchored to the rope by folding over like a rope the end portions of the same and tightening them by more turns of metal wire 12.

The connection of the members 1 and 1' may be carried out by means of a pair of closed ropes 8 and 8' or by a pair of open ropes 9 and 9'.

In the case of closed ropes (FIG. 8), these are at first crossed a suitable number of times on two corresponding hooks and then anchored to the hooks situated on the opposite side of the pneumatic tire.

In the case of open ropes (FIG. 9), they are applied one from the left to the right side and the other one from the right to the left side or vice versa so as to be crossed at the axis of the wheel.

In practice, therefore, there is obtained a symmetrical tangential connection of the two members 1 and 1', which accomplish a closed peripherical structure, elastic but inextensible beyond determined limits, adapted to embrace firmly the pneumatic tire, without the possibility of being accidentally removed therefrom, also in case of extreme stresses.

From the foregoing specification and from perusal of the various figures on the accompanying drawings one may easily see the great utility and the practical application, characterizing the nonskid structure applicable to pneumatic tires according to the present invention.

What I claim is:

1. A non-skid device to be mounted on a pneumatic tire which consists of two grip members made of metal rod, each member being folded to form essentially one long side and two short sides of a rectangular frame, the two short sides being bent about the middle thereof in a direction perpendicular to the plane of the rectangular frame to form a first portion which is part of the rectangular frame and a second portion perpendicular thereto, each of the second portions terminating in a hook, the length of the first portion of the short sides being essentially as the width of the tread of the tire, the long side of said rectangular frame being inwardly curved about the middle thereof prior to mounting on the tire for snug fitting engagement with the inner side wall of the tire, said second portions of said short sides being inwardly curved about the middle thereof prior to mounting on the tire for snug fitting engagement with the outer side wall of the tire without engaging the rim, elastic means for connecting the four hooks of the two grip members when the grip members are mounted on the tire and embrace the tire with the long sides of the rectangular frame lying on the inner side wall of the tire, the first portions of the short sides lying horizontally on the tread of the tire and the second portions of the short sides lying on the outer sidewall of the tire without engaging the rim.

2. The device according to claim 1 wherein said first portions of the short sides of the rectangular frame have an undulated contour.

* * * * *